Figure 1:
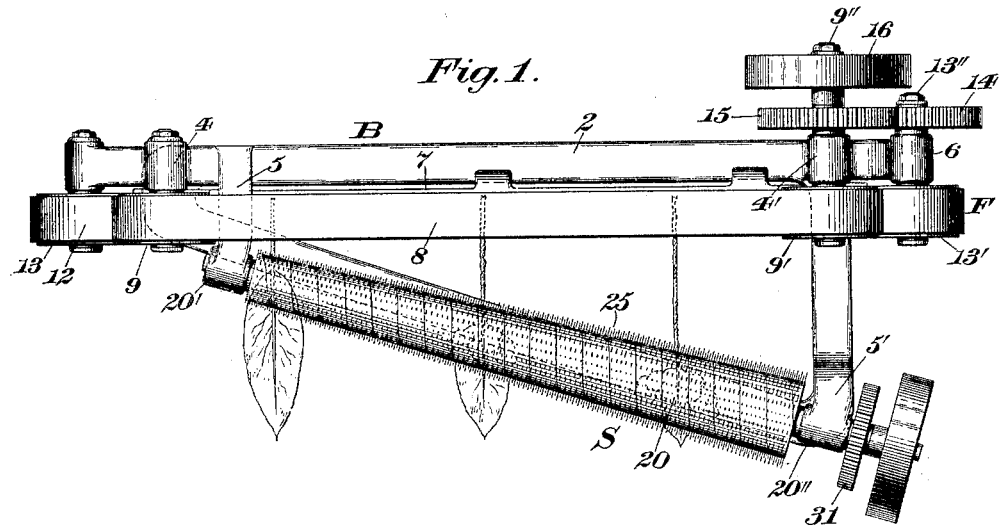

(No Model.) 3 Sheets—Sheet 1.

W. H. BUTLER.
TOBACCO LEAF STEMMING MACHINE.

No. 595,041. Patented Dec. 7, 1897.

Witnesses:
J. L. Edwards Jr.
Fred. J. Dole.

Inventor:
William H. Butler.
By his Attorney,
F. H. Richards.

(No Model.) 3 Sheets—Sheet 2.
W. H. BUTLER.
TOBACCO LEAF STEMMING MACHINE.
No. 595,041. Patented Dec. 7, 1897.
Fig. 3.
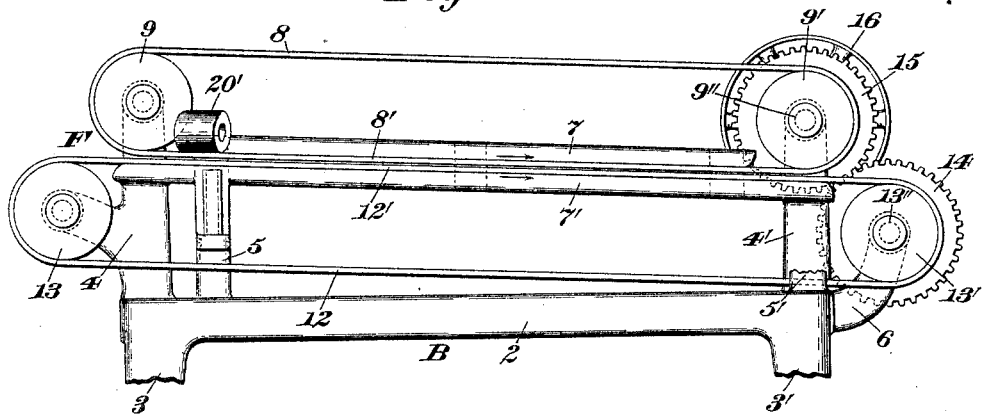
Fig. 4.
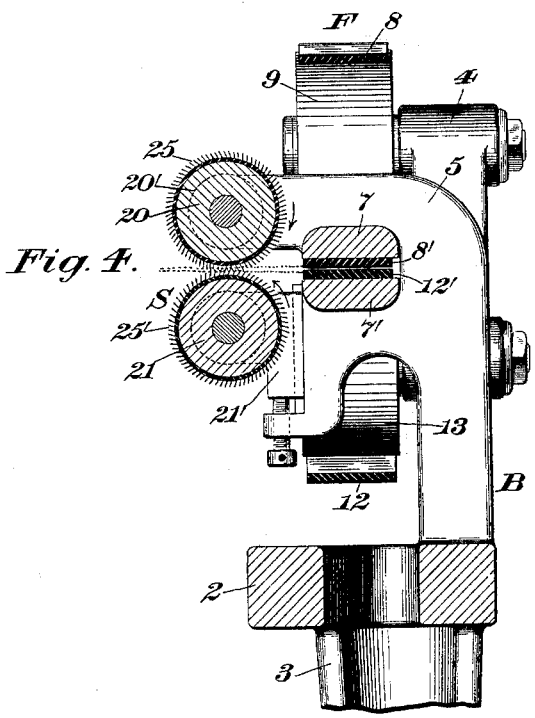
Fig. 10.
Fig. 11.
Witnesses:
J. L. Edwards Jr.
Fred. J. Dole
Inventor:
William H. Butler.
By his Attorney,
F. H. Richards.

(No Model.) 3 Sheets—Sheet 3.

W. H. BUTLER.
TOBACCO LEAF STEMMING MACHINE.

No. 595,041. Patented Dec. 7, 1897.

Witnesses:
E. L. Edwards Jr.
Fred. J. Dole

Inventor:
William H. Butler.
By his Attorney,
F. H. Richards.

United States Patent Office.

WILLIAM H. BUTLER, OF HARRISON, NEW YORK.

TOBACCO-LEAF-STEMMING MACHINE.

SPECIFICATION forming part of Letters Patent No. 595,041, dated December 7, 1897.

Application filed October 3, 1896. Serial No. 607,733. (No model.)

*To all whom it may concern:*

Be it known that I, WILLIAM H. BUTLER, a citizen of the United States, residing in Harrison, in the county of Westchester and State of New York, have invented certain new and useful Improvements in Tobacco-Leaf-Stemming Machines, of which the following is a specification.

This invention relates to leaf-stemming machines, and is more especially designed for removing the stems from tobacco-leaves.

In the economy of nature leaves are formed with stems from which the laterals and the laminæ or blade portions extend, and in each leaf the stem is of varying diameter—thicker where it is attached to the stalk and from thence tapering to the point of the leaf. The laminæ or blade portions of leaves also vary in diameter, being thicker and stronger at the base and of tender and weaker structure at other points. In the plants of the genus *Nicotiana* the leaves are provided with stems which are thick and tough at the portion where they are attached to the stalk and are of varying thickness and strength from thence to the point, and it has been a problem how to remove such stems without damaging the portion of the leaf which is useful and valuable in the art of tobacco manufacture. Heretofore various types of leaf-stemming machines have been employed, but owing to the fact that they have acted with positive and unvarying pressure upon all portions of the leaf the thinner and more frangible portions thereof have been more or less crushed, torn, or broken, and the results in all cases have not been satisfactory.

A leading object of my invention is the provision of means having a working surface or surfaces of varying efficiency for removing stems from leaves, and I consider as within the purview of the invention any and all devices and mechanisms which operate upon the leaf with a varying wiping action—*i. e.*, with a wiping action more forcible on one portion of the leaf than on another portion thereof, whereby the stripping operation is accomplished with less danger of tearing or crushing the thinner or more tender and frangible portions of the leaf.

Another object of this invention is to furnish a simple and efficient tobacco-leaf-stemming machine embodying rotative stripping mechanism of improved construction and organization adapted for operating upon successive portions of the leaf with a wiping action of successively-reduced pressure commensurate with the reduction in thickness or tenacity of successive portions of the leaf, whereby the thicker or more tenacious inner portion of the leaf will be subjected to a wiping action of the relatively great pressure or force required for separating this portion of the leaf-body from the stem and whereby the other successive portions of the leaf of gradually reduced thickness and tenacity will be subjected to wiping actions of successively-reduced pressures to thereby move the wings of the leaf from the stem by a continuous wiping action of differential pressure substantially proportionate to the thickness of the leaf, and avoid the possibility of skiving, tearing, or destroying any portion of the lamina or blade portion of the leaf.

A further object of the invention is to provide in connection with leaf-feeding mechanism of a tobacco-leaf-stemming machine two stemming-rolls having resilient brushlike surfaces of decreased compactness or rigidity from the entrant end of the rolls toward the exit end of said rolls for the purpose of operating upon successive portions of the leaf with a wiping action of successively-reduced pressures, as will be hereinafter more fully described.

Figure 2:
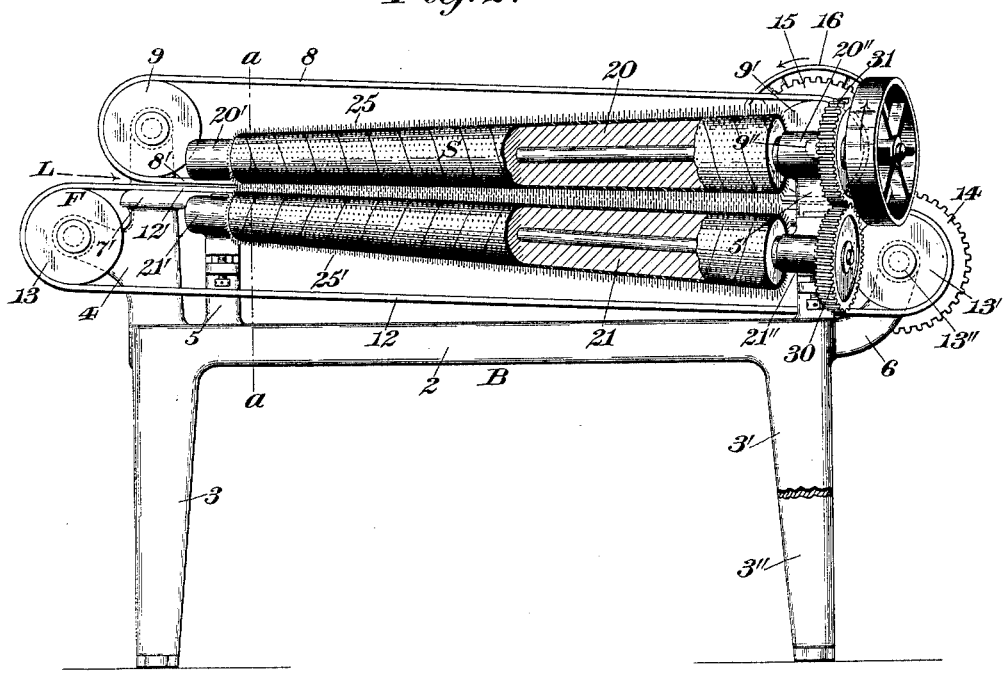
Figure 5:
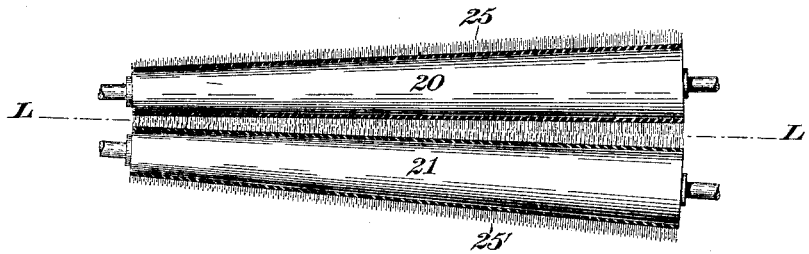
Figure 6:
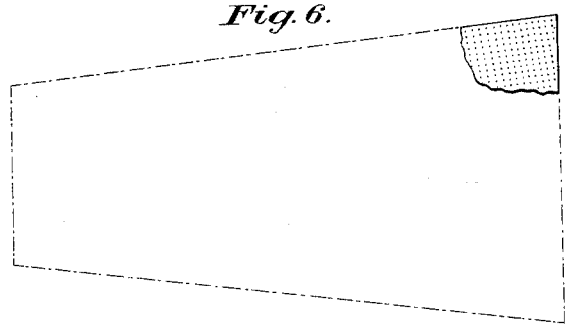
Figure 7:
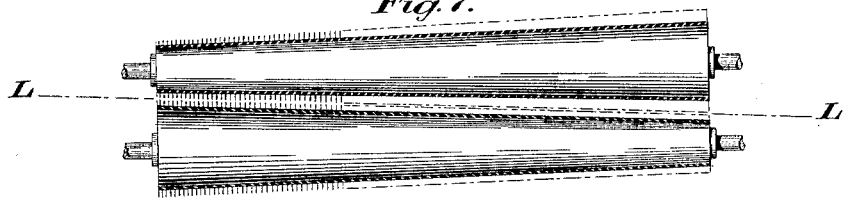
Figure 8:
Figure 9:
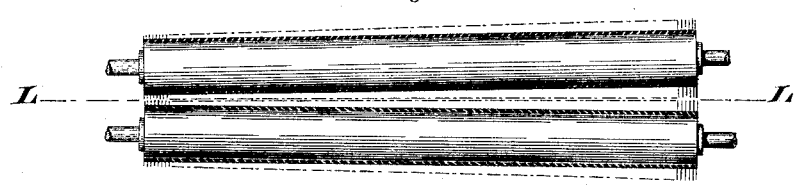

In the drawings accompanying and forming part of this specification, Figure 1 is a plan view of a tobacco-leaf-stemming machine embodying one form of my present invention, the stemming-roll being shown in this figure as conical and having circumferent teeth of increased length from the entrant end toward the exit end of said roll, said figure also showing three tobacco-leaves substantially as they appear at three different stages of the stemming operation. Fig. 2 is a front view, partially in section, of the tobacco-leaf-stemming machine shown in Fig. 1. Fig. 3 is a front view of a portion of the framework of the stemming-machine with the stemming-rolls removed, showing the construction and arrangement of the feed mechanism. Fig. 4 is a relatively large cross-sectional view of a portion of the stemming-machine, taken on a line corresponding with the dotted line *a a*, Fig. 2, and looking toward the left hand in said figure. Fig. 5 is a longitudinal section of the stemming-rolls shown in Fig. 2. Fig. 6 is a plan view, partially in dotted lines, of one form of card-clothing, which may be applied to and constitute the brush-surface of the stemming-roll. Fig. 7 is a cross-sectional view, similar to Fig. 5, of two conical stemming-rolls, similar to those shown in Fig. 5, set with the larger end of one roll adjacent to the smaller end of the other roll and having the operative face of the brush-surface of one roll in parallelism with the face of the roll proper. Fig. 8 is a longitudinal section, similar to Figs. 5 and 6, of two coöperative stemming-rolls, one of which is conical and has teeth arranged in a spiral and of gradually-increased length from the small to the larger end of said roll and the other of which rolls is cylindrical and has teeth circumferent to the working end or in parallelism with the axis of the roller. Fig. 9 is a longitudinal section of two coöperative cylindrical stemming-rolls set with their longitudinal axes inclined relatively and which rolls are shown having circumferent teeth of gradually-increased length in the direction of divergence of said rolls. Fig. 10 is a longitudinal section of a cylindrical stemming-roll having equidistantly-disposed circumferent teeth of equal length, but of gradually decreased diameter and rigidity from one end toward the other end of said roll; and Fig. 11 is a longitudinal section of a stemming-roll having circumferent teeth of substantially corresponding lengths and diameters set closely together at one end and at gradually-increasing distances apart toward the other end of said roll.

Similar characters designate like parts in all the figures of the drawings.

The tobacco-leaf-stemming machine in the preferred construction and organization thereof shown in the drawings comprises a suitable framework, feed mechanism supported on the framework and effective for advancing the leaf and for presenting the same to the action of the stemming mechanism, stemming mechanism embodying two stemming-rolls operable for separating the body or blade portion of the leaf from the stem and having their coöperative faces of increased pliability from the entrant end to the exit end of said rolls, whereby the rolls will operate upon the leaf with a wiping action of decreased pressure as the leaf passes from the entrant end toward the exit end of said rolls, and means for operating the rolls.

The framework of the stemming-machine, which may be of any suitable general construction for supporting the operative parts of the machine and which is designated in a general way by B, is shown comprising a triangular-shaped main body portion or bed 2, having suitable legs 3, 3', and 3'', located one at each corner thereof, uprights 4 and 4', located at opposite ends of the bed 2 and having suitable bearings for supporting the rotative parts of the feed mechanism, bearing-brackets 5, 5', and 6, located on the bed and supporting the stemming mechanism, and two bearing-plates 7 and 7', located, preferably, one above the other with their adjacent faces in parallelism with and adapted for controlling the pressure of the feed mechanism upon the stem of the leaf.

The feed mechanism, which is designated in a general way by F, is shown comprising two endless carriers or belts 8 and 12, located one above the other, with their adjacent runs between the two bearing-plates 7 and 7' and in close proximity to one another, and driving mechanism for said carriers. The upper carrier or belt 8 is shown supported at opposite ends of its upper and lower runs upon drums or pulleys 9 and 9', whose shafts are journaled in suitable bearings in the uprights 4 and 4', respectively, and the lower carrier or belt 12 is shown supported at opposite ends of its upper and lower runs upon drums or pulleys 13 and 13', respectively, journaled at one end in a suitable bearing in the upright 4 and at the other end in a bearing on the bracket 6, located at opposite ends of the machine. The inner adjacent runs 8' and 12' of the two endless carriers 8 and 12 are so disposed with relation to each other that the stem of the leaf may be introduced between and be grasped by said runs for the purpose of advancing the leaf and presenting the same to the stemming mechanism, as will be hereinafter more fully described.

As a means for advancing the stem-engaging runs of the two endless carriers in the same direction and at the same speed the shaft 13'' of the pulley 13' is shown furnished with a spur-wheel 14, which meshes with a spur-wheel 15, fixed to the shaft 9'' of the drum 9', and which shaft 9'' is also provided with a driving-pulley or belt-wheel 16, through the medium of which the pulleys 9' and 13' are rotated in opposite directions in unison, said pulley 16 being driven from any suitable source of power. (Not shown.)

It is desired to state in the above connection that the construction and organization of the feeding mechanism may be variously modified within the scope and limits of my invention and that the leaves may be fed to the carriers by hand or in any other desired manner.

The stemming mechanism *per se*, which is designated in a general way by S, comprises in the preferred form thereof shown in the drawings two coöperative superimposed stemming-rolls 20 and 21, respectively, the shaft of the roll 20 of which is journaled at opposite ends thereof in suitable bearings 20' and 20'' in the bearing-brackets 5 and 5', respectively, and the lower roll 21 of which has its shaft likewise journaled in suitable bearings 21' and 21'' in said brackets 5 and 5', respectively, said bearings being relatively separated to facilitate the unobstructed entrance between the rolls of the leaf or leaves to be operated upon thereby.

By the terms "entrant end" and "exit end" of the rolls is meant those ends of the rolls where the first and last stages, respectively, of the stemming operation are performed, the entrant end of the rolls being shown in Figs. 1 and 2 as at the left-hand end of the machine and the exit end as at the right-hand end of the machine.

In practice the stemming-rolls 20 and 21 will be set with their longitudinal axes in vertical alinement and at an acute angle horizontally to the line of feed L L, the entrant end of the rolls being set in close juxtaposition to the stem-grasping portions or feed-runs 8' and 12' of the carriers 8 and 12, so that the leaf as it is advanced by the carriers will be entered between the stemming-rolls in such position that the coöperating brush-faces of the rolls will first act upon the extreme inner or butt end of the body or inner portion of the leaf, and said leaf will be gradually drawn inward as the same is advanced from the entrant toward the exit end of the stemming-rolls owing to the gradually-increasing distance between the rolls and the carriers from the entrant to the exit end of said rolls, as will be readily understood by reference to Fig. 1 of the drawings.

For the purpose of constructing the stemming-rolls for operating upon the successive portions of the leaf with a wiping action of gradually-decreased pressure commensurate with the different thicknesses and tenacity of said successive portions, so that the wings or blade portion of the leaf may be readily separated from the stems by a continuous wiping action without injury to the leaf, said rolls 20 and 21 are furnished with brush-surfaces, (designated by 25 and 25', respectively,) the construction and organization of said brush-surfaces being such that they will operate upon successive portions of the leaf with decreased bearing-pressure proportionate to the decrease in thickness or tenacity of said successive portions of the leaf.

Inasmuch as it is possible to secure the results set forth in the last preceding paragraph by the employment of various forms of stemming-rolls arranged in various manners and all of which rolls would necessarily embody the essence or essential characteristics of my present invention, I have for convenience shown several modified constructions and arrangements of stemming-rolls in the drawings, and I wish it distinctly to be understood that my present invention is not limited to the particular form of rolls or to the particular dispositions or arrangements of the rolls shown in the drawings, as these may be variously modified without departure from this invention.

In Figs. 1, 2, 4, and 5 of the drawings I have shown two superimposed conical rolls having brush-surfaces the teeth of which intermesh and are of gradually-increased length from the smaller to the larger ends of said rolls. In this instance the leaf will enter between the rolls at the small ends thereof, said small ends being adjacent to each other, and the coöperating brushes of the two rolls will operate upon the leaf with a wiping action of gradually-decreased pressure as the leaf passes from the entrant end toward the exit end of said rolls, owing to the gradually-increasing flexibility of the teeth in this direction due to the increased length of said teeth. Furthermore, it will be seen from the constructions shown in Figs. 1, 2, 5, and 8 that as the leaf is passed between and from the small entrant ends of the rolls toward the larger exit ends thereof said rolls act upon the leaf with differential peripheral velocities from the thicker toward the thinner portions thereof, thus subjecting the thicker portions of the leaf to more energetic and forcible action than the thinner portions thereof and facilitating the operation of removing the wings from the stem without liability of tearing the same, the surface speed and the diameter of the successive portions of the rolls being such that the peripheral velocities of the successive portions thereof will successively increase in accordance with the reduction in tensile strength of the successive portions of the leaf, whereby the thinner and weaker portions of the leaf are removed from the stem with increased speed as compared with the thicker and stouter portions thereof.

In Fig. 7 I have shown two superimposed conical stemming-rolls set with the small end of one adjacent to the large end of the other and having intermeshing brush-surfaces, the teeth of the brush-surface of the upper roll being of increased length toward the larger end and those of the lower roll being of equal length from end to end, the action of these brush-surfaces upon the leaf being the same as the operation of the brush-surfaces of the rolls shown in Fig. 5.

In Fig. 8 I have shown two superimposed stemming-rolls, the upper one of which is conical and has spirally-disposed circumferent teeth of gradually-increased length from the smaller to the larger end of said roll and the lower roll of which is cylindrical and of uniform diameter from end to end and has circumferent teeth of equal length from end to end of the roll, which rolls perform the same function as the rolls shown in Figs. 5 and 7.

In Fig. 9 I have shown two superimposed cylindrical rolls set with their axes inclined relatively to one another and each having circumferent brush-teeth of gradually-increasing length in the same direction from one end of said roll to the other, the space between the two rolls in this instance being tapered from end to end.

In Fig. 10 I have shown a cylindrical roll having circumferent teeth of successively-decreased rigidity and of the same length and distance apart from end to end of the roll, said teeth being of greater diameter at the entrant or left-hand end of the roll and being of gradually-reduced diameter toward the opposite end of said roll. This roll is adapted to be used in connection with a similar roll, and the two rolls may be set with their axes in substantial parallelism.

In Fig. 11 I have shown a cylindrical roll having teeth which are of substantially the same diameter from end to end of the roll and which are set at gradually-increasing distances apart from the entrant end toward the exit end of said roll.

As a means for rotating the two stemming-rolls of the machine in opposite directions the shaft of the roll 21 is furnished with a gear 30, which meshes with a gear 31 on the shaft of the roll 20, and this shaft is furnished with a driving-pulley, which may be driven by a belt (not shown) deriving its motion from any suitable source of power.

In practice it is desirable to arrange the brush-surfaces of the two stemming-rolls in opposite spirals and to drive the rolls and feed mechanism at comparative speeds of predetermined velocities, so that the stem and body portion of the leaf will be advanced by the feed mechanism and rolls, respectively, in unison, the spiral disposition of the wiping or brush surfaces of the two rolls acting as a screw to advance the leaf-body in unison with the feed mechanism. It is desired to state in this connection that if conical stemming-rolls, such as shown in Figs. 1 and 2, are employed the pitch of the successive portions of the spirals of said rolls will in practice be of such relative degrees as will insure a uniform advancing movement of the leaf in unison with the feed mechanism, as said leaf passes from the entrant toward the exit ends of said rolls, notwithstanding the difference in peripheral velocities of the successive portions of said rolls.

In the drawings the line of feed, which is represented by the dotted line L L, Figs. 5, 7, 8, and 9, respectively, is slightly inclined to a horizontal plane, but it will be obvious that it might be substantially horizontal.

For convenience the lower feed-roll is shown supported in bearings which are adjustable toward and away from the bearings of the upper roll, which bearings may be of any suitable construction and adjusted in any suitable manner, said bearings being herein shown supported in slideways and provided with set-screws for adjusting the same, the teeth of the intermeshing gears of the two rolls being, in practice, of sufficient depth to facilitate the slight adjustment necessary. This means of adjustment may, however, be variously modified.

Having described my invention, I claim—

1. Leaf-stemming means comprising coacting opposing surfaces adapted in operation to work with a wiping action upon the leaf, portions of one or both of said surfaces being of different efficiencies; and means for operating one or both of said surfaces.

2. Leaf-stemming means comprising coacting opposing surfaces adapted in operation to work with a wiping action upon the leaf, portions of each of said surfaces being of different efficiencies; and means for operating said surfaces.

3. Leaf-stemming means comprising coacting opposing brush-like working surfaces adapted in operation to work with a wiping action upon the leaf, portions of each of said surfaces being of varying efficiencies; and means for operating said surfaces.

4. Leaf-stemming rolls having coacting opposing surfaces adapted in operation to work with a wiping action upon the leaf, portions of each of said roll-surfaces being of different efficiencies; combined with means for operating said rolls.

5. Leaf-stemming rolls having coacting opposing working surfaces portions of each of which are of different efficiencies, and of different peripheral velocities, adapted in operation to work with a wiping action upon the leaf; combined with means for operating said rolls.

6. In combination with feed mechanism, leaf-stemming means comprising coacting opposing surfaces adapted in operation to work with a wiping action upon the leaf, portions of each of said surfaces being of varying efficiencies; and means for operating said surfaces.

7. A leaf-stemming machine, comprising coöperative stemming-rolls having brush-like surfaces of decreasing rigidity from the entrant end toward the exit end thereof, and means for rotating said rolls, the construction being such that the rolls operate upon the leaf with a wiping action of decreasing pressure when said leaf is passed between and from the entrant ends toward the exit ends of said rolls.

8. A leaf-stemming machine, comprising coöperative stemming-rolls, one of which has a spiral brush-like surface of decreasing rigidity in the direction of the length of the rolls, the construction of the rolls being such that the same will operate upon the leaf with a wiping action of decreasing pressure when said leaf is passed between and from the entrant ends toward the exit ends of said rolls.

9. In a leaf-stemming machine, the combination, with suitable feed mechanism, of stemming-rolls having coöperative brush-like surfaces whose successive portions are of relatively different elasticities and are adapted to act upon successive portions of the leaf with a wiping action of varying pressures.

10. In a leaf-stemming machine, stemming-rolls having circumferential teeth arranged in opposing spirals, the teeth of one roll relatively to those of the other roll, and of decreasing rigidity from the entrant ends toward the exit ends of said rolls, the construction being such that the rolls will operate upon the leaf with a wiping action of gradually-decreasing pressure when the same is passed between and from one end toward the other end of said rolls.

11. In a leaf-stemming machine, stemming mechanism embodying a stemming-roll having a brush-like surface which is inclined with relation to the axis of said roll, and the successive portions of which are adapted to act with a progressive wiping action upon successive portions of the leaf with different peripheral velocities as the same is passed from one toward the other end of said rolls; combined with complemental stemming and leaf-feeding devices.

12. A leaf-stemming mechanism comprising a stemming-roll having a brush-like surface inclined from end to end relatively to the axis of said roll and of gradually-increasing flexibility in the direction of the length thereof, whereby the leaf is subjected to a progressive wiping action of varying efficiency; a complemental stemming device in operative relation with said roll; and means for feeding the leaf longitudinally of said rolls.

13. In a machine of the class specified, a stemming-roll having a conical surface composed of spirally-disposed teeth; combined with a complemental stemming device; means for feeding the leaf in the direction of the length of the rolls; and means for rotating the roll, whereby successive portions of the roll will have a wiping action upon the leaf of varying peripheral velocities.

14. In a machine of the class specified, a stemming-roll having resilient teeth of increasing lengths from the entrant toward the exit ends of the roll; combined with means coöperating with said stemming-roll, to cause the leaf to be operated on with a wiping action of gradually-decreasing pressure when the same is passed between said stemming-roll and coöperating means.

15. In a machine of the class specified, the combination, with suitable leaf-feeding mechanism, of stemming members having intermeshing teeth of decreased density or rigidity from the entrant ends toward the exit ends of said members; and means for actuating said members, whereby said teeth will operate upon the leaf with a wiping action of decreasing pressure, when the same is advanced by the feeding mechanism, from the entrant toward the exit ends of said members.

16. In a machine of the class specified, leaf-stemming rolls each having a brush-like surface of increasing pliability in the direction of the length thereof, operating upon the leaf with a progressive wiping action, and one of said rolls having one end of smaller diameter than the opposite end thereof; combined with means for rotating said rolls; and means for feeding the leaf between, and in the direction of said rolls.

17. In a leaf-stemming machine, the combination, with stemming mechanism embodying stemming-rolls having coöperative brush-like faces of gradually-increasing resiliency from the entrant ends toward the exit ends thereof, said faces operating with a progressive wiping action upon the leaf, of feeding mechanism comprehending instrumentalities for engaging the stem of, and for advancing, the leaf in the direction of the length of the rolls and simultaneously drawing said leaf through the rolls in a plane transverse to the longitudinal axis of the rolls; and means for rotating the rolls and for actuating the feed mechanism.

18. In a leaf-stemming machine, the combination, with two conical stemming-rolls set with their axes at acute angles to the line of feed, and also having brush-like wiping-surfaces of increased pliability in the direction of their lengths; combined with leaf-feeding mechanism located at one side of, and in close proximity to, the smaller ends of the stemming-rolls and effective for engaging the stem of, and for feeding, the leaf in the direction of the length of said rolls.

19. In a leaf-stemming machine, the combination, with suitable feed mechanism, of stemming mechanism comprising two stemming-rolls set with their adjacent surfaces in relatively divergent lines vertically, and at acute angles horizontally, with relation to the line of feed, and having intermeshing, circumferential, resilient teeth which are of gradually-decreased rigidity in the direction of the length of the rolls, said teeth operating with a wiping action upon the leaf.

20. In a leaf-stemming machine, the combination of rotative stemming-rolls for separating the body of the leaf from the stem by a wiping action and arranged with their axes at acute angles to the line of feed, and having their leaf-engaging surfaces of gradually-increased pliability in the direction of the length of the rolls; mechanism for rotating said rolls; and means for feeding the leaf in a line transverse to the plane of rotation of said rolls.

21. In a leaf-stemming machine, the combination of stemming mechanism including stemming-rolls having oppositely-spiraled brush-like surfaces for advancing one end of the leaf in unison with the feed mechanism and longitudinally of the rolls and for simultaneously removing by a wiping action the body of the leaf from the stem; and leaf-feeding mechanism constructed and organized to engage and advance the opposite end of the leaf in the direction of the length of the rolls and to simultaneously draw said leaf longitudinally through the rolls in a plane intersecting the longitudinal axis of said rolls.

22. In a leaf-stemming machine, the combination, with continuously-progressive feed mechanism comprehending instrumentalities for engaging and advancing the leaf in the direction of the length of the stemming-rolls; of stemming-rolls supported with their axes at acute angles with relation to the line of feed and having their coöperative faces of increased pliability in the direction of the length of the rolls, and also having their operative surfaces formed in oppositely-arranged spirals for advancing the body of the leaf in unison with the feed mechanism, said teeth operating with a wiping action upon the leaf; mechanism for rotating said rolls; and means for adjusting the rolls, to change the relation of their coöperative surfaces.

23. In a leaf-stemming machine, the combition, with feed mechanism for advancing the leaf, of coöperative stemming-rolls supported with their axes in divergent lines vertically with relation to each other, and at an acute angle horizontally with relation to the line of feed, and having coöperative, resilient surfaces, the successive portions of which are of relatively varying rigidities and operate with a progressive wiping action upon the leaf.

WILLIAM H. BUTLER.

Witnesses:
S. SEWARD GOULD,
E. T. SMITH.